US012757118B2

(12) United States Patent
Zhao et al.

(10) Patent No.: US 12,757,118 B2
(45) Date of Patent: Oct. 6, 2026

(54) METHOD FOR MEASURING CHANNEL BUSY RATIO, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Yi Ding, Dongguan (CN); Shichang Zhang, Dongguan (CN); Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 133 days.

(21) Appl. No.: 18/385,500

(22) Filed: Oct. 31, 2023

(65) Prior Publication Data

US 2024/0064644 A1 Feb. 22, 2024

Related U.S. Application Data

(63) Continuation of application No. PCT/CN2021/092434, filed on May 8, 2021.

(51) Int. Cl.
*H04W 52/02* (2009.01)
*H04W 72/02* (2009.01)
*H04W 72/40* (2023.01)

(52) U.S. Cl.
CPC ....... *H04W 52/0238* (2013.01); *H04W 72/02* (2013.01); *H04W 72/40* (2023.01)

(58) Field of Classification Search
CPC ......... H04W 52/0238; H04W 52/0216; H04W 72/02; H04W 72/40; H04W 72/0446; H04W 72/542
See application file for complete search history.

(56) References Cited

U.S. PATENT DOCUMENTS

2010/0296410 A1* 11/2010 Kazmi .................. H04W 24/10 370/252
2019/0200366 A1 6/2019 Park
(Continued)

FOREIGN PATENT DOCUMENTS

CN 101971662 A 2/2011
CN 111492709 A 8/2020
CN 111867106 A 10/2020

OTHER PUBLICATIONS

LG ("Discussion on resource allocation for power saving," 3GPP Draft; R1-2103378, vol. RAN WG1, No. e-Meeting; Apr. 12, 2021-Apr. 20, 2021, Apr. 7, 2021 (Apr. 7, 2021), XP052178121 (Year: 2021).*
(Continued)

*Primary Examiner* — Jamal Javaid
(74) *Attorney, Agent, or Firm* — BAYES PLLC

(57) ABSTRACT

Embodiments of the present application provide a method for measuring a channel busy ratio (CBR), a terminal device, and a network device, which are applicable to calculating the CBR in a sidelink transmission system configured with SL DRX or partial sensing. The method for measuring a CBR includes: a terminal device determines the CBR of a target time according to a measurement result of an SL RSSI within N time units before the target time.

16 Claims, 8 Drawing Sheets

(56) References Cited

U.S. PATENT DOCUMENTS

2020/0029245 A1* 1/2020 Khoryaev ............ H04W 36/22
2021/0105661 A1 4/2021 Baghel

OTHER PUBLICATIONS

First Office Action of the European application No. 21941069.3, issued on Apr. 4, 2025. 8 pages.
First Office Action of the Japanese application No. 2023-565622, issued on Jun. 24, 2025. 10 pages with English translation.
Supplementary European Search Report in the European application No. 21941069.3, mailed on Apr. 16, 2024. 11 pages.
Lg Electronics. "Discussion on Resource Allocation for Power Saving", 3GPP TSG RAN WG1 Meeting #104bis-e, R1-2103378,vol. No., Apr. 20, 2021 (Apr. 20, 2021),ISSN:sections 2.4 and 2.5, 21 pages.
Lg Electronics. "Discussion on Resource Allocation for Power Saving", 3GPP TSG RAN WG1 Meeting #104-e, R1-2100517,vol. No., Feb. 5, 2021 (Feb. 5, 2021), ISSN: sections 2.4 and 2.5, 20 pages.
International Search Report in the international application No. PCT /CN2021/092434, mailed on Jan. 28, 2022, 5 pages with English translation.
English translation of the Written Opinion of the International Search Authority in the international application No. PCT /CN2021/092434, mailed on Jan. 28, 2022, 6 pages with English translation.
Apple, "Discussion on Sidelink Resource Allocation for Power Saving", 3GPP TSG RAN WG1 #104b-e, R1-2103121, e-Meeting, Apr. 12-20, 2021, 13 pages.
Huawei, HiSilicon, "Sidelink resource allocation to reduce power consumption", 3GPP TSG RAN WG1 Meeting #104bis-e, R1-2102323, E-meeting, Apr. 12-20, 2021, 20 pages.
Vivo, "Resource allocation for sidelink power saving", 3GPP TSG RAN WG1 #104b-e, R1-2102539, e-Meeting, Apr. 12-20, 2021, 21 pages.
MediaTek Inc., "Discussion on sidelink power saving", 3GPP TSG RAN WG1 #104b-e, R1-2102708, e-Meeting, Apr. 12-20, 2021, 9 pages.
Xiaomi, "Discussion on sidelink resource allocation enhancement for power saving"3GPP TSG RAN WG1 #104b-e R1-2102965, e-Meeting, Apr. 12-20, 2021, 7 pages.
Catt, Gohigh, "Discussion on resource allocation for power saving", 3GPP TSG RAN WG1 Meeting #104b-e R1-2102606, e-Meeting, Apr. 12-20, 2021, 23 pages.
Intel Corporation, "Sidelink Power Saving Solutions", 3GPP TSG RAN WG1 #104bis-e, R1-2103048, e-Meeting, Apr. 12-20, 2021, 17 pages.
Samsung, "On resource allocation for power saving", 3GPP TSG RAN WG1 Meeting #104bis-e, R1-2103257, e-Meeting, Apr. 12-20, 2021, 16 pages.
NEC, "Discussion on resource allocation for power saving", 3GPP TSG RAN WG1 #104b-e, R1-2103517, e-Meeting, Apr. 12-20, 2021, 10 pages.
Lenovo, Motorola Mobility, "Sidelink resource allocation for power saving", 3GPP TSG RAN WG1 #104b-e, R1-2103548, e-Meeting, Apr. 12-20, 2021, 11 pages.
First Office Action of the Korean application No. 10-2023-7037832, issued on Jan. 21, 2026.
Supplementary European Search Report in the European application No. 26168263.7, mailed on Jun. 22, 2026.

* cited by examiner

METHOD FOR MEASURING CHANNEL BUSY RATIO, TERMINAL DEVICE, AND NETWORK DEVICE

CROSS-REFERENCE TO RELATED APPLICATION

This application is a continuation of International Patent Application No. PCT/CN2021/092434 filed on May 8, 2021. The entire content of the prior application is incorporated herein by reference in its entirety.

BACKGROUND

In a New Radio Sidelink (NR SL) system, in order to lower power consumption of a User Equipment (UE), a mechanism of partial sensing and a mechanism of Sidelink Discontinuous Reception (SL DRX) are introduced. In the two mechanisms, the UE is not always in a sensing state. For example, in the case of partial sensing, the UE only senses part of slots within each period. In the mechanism of SL DRX, the UE performs reception of data during the active time of the DRX, and the UE does not perform the reception of the data during the inactive time of the DRX and normally does not perform the measurement. How the UE can measure a Channel Busy Ratio (CBR) in these two mechanisms is an urgent problem to be solved.

SUMMARY

Embodiments of the disclosure relate to the field of communication, and particularly to a method for measuring a Channel Busy Ratio (CBR), a User Equipment, and a network device. Embodiments of the disclosure provide a method for measuring a CBR, a UE, and a network device, which can be used to calculate a CBR in a sidelink transmission system configured with the SL DRX or the partial sensing.

In a first aspect, a method for measuring a CBR is provided, which includes the following operation.

A UE determines a CBR at a target time according to a measurement result for Sidelink Received Signal Strength Indicator (SL RSSI) within N time units before the target time.

In a second aspect, a method for measuring a CBR is provided, which includes the following operation.

A network device sends first information to a UE. The first information is configured to indicate N time units before a target time, and a measurement result for SL RSSI within the N time units is used to determine a CBR at the target time.

In a third aspect, a UE is provided, which implements the method of the first aspect.

Specifically, the UE includes a functional module configured to implement the method of the first aspect.

In a fourth aspect, a network device is provided, which implements the method of the second aspect.

Specifically, the network device includes a functional module configured to implement the method of the second aspect.

In a fifth aspect, a UE is provided. The UE includes a processor and a memory having stored thereon a computer program. The processor is configured to invoke and run the computer program stored in the memory to implement the method of the first aspect.

In a sixth aspect, a network device is provided. The network device includes a processor and a memory having stored thereon a computer program. The processor is configured to invoke and run the computer program stored in the memory to implement the method of the second aspect.

In a seventh aspect, an apparatus is provided, which is configured to implement the method of any one of the first aspect and the second aspect.

Specifically, the apparatus includes a processor configured to invoke and run a computer program from a memory to cause a device installed with the apparatus to implement the method of any one of the first aspect and the second aspect.

In an eighth aspect, a computer-readable storage medium is provided. The computer-readable storage medium is configured to store a computer program which causes a computer to implement the method of any one of the first aspect and the second aspect.

In a ninth aspect, a computer program product is provided. The computer program product includes computer program instructions which cause a computer to implement the method of any one of the first aspect and the second aspect.

In a tenth aspect, a computer program is provided, which, when executed on a computer, causes the computer to implement the method of any one of the first aspect and the second aspect.

DETAILED DESCRIPTION

Figure 1:
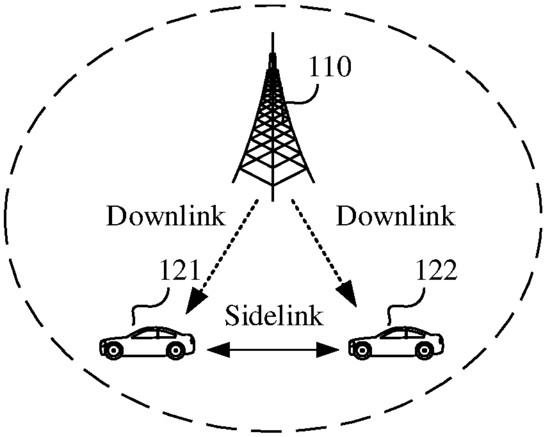
FIG. 1 is a diagram of a communication system to which an embodiment of the present disclosure is applicable.

Technical solutions in the embodiments of the disclosure would be described below in combination with the drawings in the embodiments of the disclosure. Obviously, the described embodiments are a portion of the embodiments of the present disclosure, rather than all of them. Based on the embodiments of the disclosure, all other embodiments obtained by those skilled in the art without creative efforts fall within the scope of protection of the present disclosure.

The embodiments of the disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of NR system, a LTE-based access to unlicensed spectrum (LTE-U) system, a NR-based access to unlicensed spectrum (NR-U) system, a Non-Terrestrial Network (NTN) system, a Universal Mobile Telecommunication System (UMTS), a Wireless Local Area Network (WLAN), a Wireless Fidelity (WiFi), a 5th-Generation communication (5G) system, or another communication system, or the like.

Generally speaking, a limited number of connections are supported by a conventional communication system, and are also easy to be implemented. However, with the development of communication technologies, a mobile communication system may not only support conventional communication, but also support communication such as D2D communication, Machine to Machine (M2M) communication, Machine Type Communication (MTC), Vehicle to Vehicle (V2V) communication, or V2X communication, or the like, and the embodiments of the disclosure may also be applied to these communication systems.

Optionally, the communication system in the embodiments of the disclosure may be applied to a Carrier Aggregation (CA) scenario, or may be applied to a Dual Connectivity (DC) scenario, or may be applied to a standalone (SA) networking scenario.

Optionally, the communication system in the embodiments of the disclosure may be applied to an unlicensed spectrum. The unlicensed spectrum may also be considered to be a shared spectrum. Alternatively, the communication system in the embodiments of the disclosure may also be applied to a licensed spectrum. The licensed spectrum may also be considered to be a non-shared spectrum.

The embodiments of the disclosure describe various embodiments in combination with a network device and a terminal device. The terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent, or a user device, or the like.

The UE may be a STAION (ST) in WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a calculating device or other processing devices connected to a wireless modem, a vehicle-mounted device, a wearable device, a UE in a next-generation communication system such as an NR network, or a UE in a future-evolved Public Land Mobile Network (PLMN) network, or the like.

In the embodiments of the disclosure, the UE may be deployed on land, including indoor or outdoor, handheld, wearable, or vehicle-mounted; or may be deployed on a water surface (such as a ship); or may be deployed in the air (such as an aircraft, a balloon, a satellite, or the like).

In the embodiments of the disclosure, the UE may be a mobile phone, a tablet computer (Pad), a computer with a wireless transceiving function, a Virtual Reality (VR) UE, an Augmented Reality (AR) UE, a wireless UE in industrial control, a wireless UE in self driving, a wireless UE in remote medical, a wireless UE in smart grid, a wireless UE in transportation safety, a wireless UE in smart city, or a wireless UE in smart home, or the like.

As an example rather than limitation, in the embodiments of the disclosure, the UE may also be a wearable device. The wearable device may also be referred to as a wearable smart device, which is a general term of wearable devices developed by applying a wearable technology to intelligently design daily wearable objects, such as glasses, gloves, watches, clothing, shoes, or the like. The wearable device is directly worn on the body, or is a portable device integrated into a user's clothing or accessory. The wearable device is not only a hardware device, but also achieves powerful functions through software support, data interaction and cloud interaction. A generalized wearable smart device has full functions and a large size, and may not rely on a smart phone to implement full or part of the functions, such as a smart watch, or smart glasses, or the like; or only focus on a certain type of application function, and needs to be used in cooperation with other devices such as a smart phone, such as various kinds of smart bracelets, smart jewelry, or the like, for monitoring physical signs.

In the embodiments of the disclosure, the network device may be a device communicating with a mobile device. The network device may be an Access Point (AP) in WLAN, a Base Transceiver Station (BTS) in GSM or CDMA, or a NodeB (NB) in WCDMA, or an Evolutional Node B (eNB or eNodeB) in LTE, or a relay station or AP, or a network device (gNB) or a base station (gNB) in a vehicle-mounted device, a wearable device and an NR network, or a network device in a future-evolved PLMN network, or a network device in an NTN network, or the like.

As an example rather than limitation, in the embodiments of the disclosure, the network device may have a mobility characteristic, for example, the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, or the like. Optionally, the network device may also be a base station arranged at a position such as land or water area, or other positions.

In the embodiments of the disclosure, the network device may provide services for a cell, and the UE may communicate with the network device through transmission resources (such as frequency domain resources or spectrum resources) used by the cell. The cell may be a cell corresponding to the network device (such as a base station), and the cell may belong to a macro base station, or may belong to a base station corresponding to a small cell. The small cell may include a metro cell, a micro cell, a pico cell, a femto cell, or the like. The small cells have characteristics of small coverage and low transmission power, and are suitable for providing high-rate data transmission services.

It should be understood that terms “system” and “network” in the disclosure may usually be used interchangeably. In the disclosure, term “and/or” refers to only an association relationship for describing associated objects and represents that three relationships may exist. For example, A and/or B may represent three cases: i.e., only A exists, both A and B exist, and only B exists. Furthermore, character “/” in the disclosure usually represents that previous and next associated objects form an “or” relationship.

The terms used in the detailed description of the disclosure are intended to explain the embodiments of the disclosure, and are not intended to limit the disclosure. The terms such as “first”, “second”, “third”, “fourth” and the like that are appeared in the specification, the claims, and the drawings of the disclosure are intended to distinguish different objects, and are not intended to describe any specific order. In addition, the terms such as “including/comprising” and “having”, or any other variant thereof are intended to cover a non-exclusive inclusion.

It should be understood that “indication” mentioned in the embodiments of the disclosure may be a direct indication, or may be an indirect indication, or may be represented as having an association relationship. For example, A indicates B, which may indicate that A directly indicates B, for example, B may be obtained by A; or may indicate that A indirectly indicates B, for example, A indicates C, and B may be obtained by C; or may indicate that A and B have an association relationship there-between.

In descriptions of the embodiments of the disclosure, term “corresponding” may indicate that there are direct or indirect correspondences between two objects, or may indicate that the two objects have an association relationship there-between, or may have an indicating and indicated relationship, a configuring and configured relationship, or the like.

In the embodiments of the disclosure, the expressions “predefined” or “preconfigured” may be achieved by pre storing corresponding codes, tables, or other modes that can be used to indicate related information in a device (e.g., a UE or a network device), specific implementations of which is not limited in the embodiments of the disclosure. For example, the expression “predefined” may be as defined in a protocol.

In the embodiments of the disclosure, a “protocol” may refer to a standard protocol in the field of communications, and may include, for example, an LTE protocol, an NR protocol, and a related protocol applying to a future communication system, which would not be limited in the embodiments of the disclosure.

FIG. 1 is a diagram of a communication system to which an embodiment of the present disclosure is applicable. Transmission resources of vehicle-mounted terminals (a vehicle-mounted terminal 121 and a vehicle-mounted terminal 122) are allocated by a base station 110. The vehicle-mounted terminals transmit data on a sidelink based on resources allocated by the base station 110. Specifically, the base station 110 may allocate resources for the single transmission or the semi-persistent transmission to the terminal.

Figure 2:
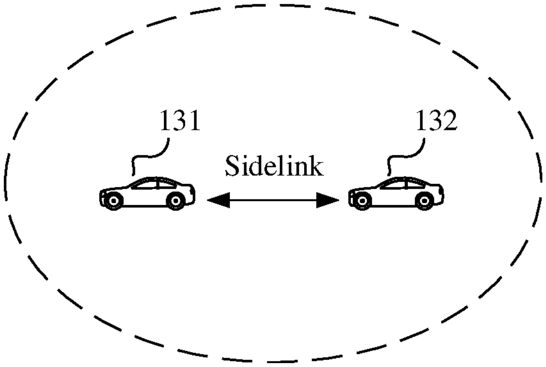
FIG. 2 is a diagram of another communication system to which an embodiment of the present disclosure is applicable.

FIG. 2 is a diagram of another communication system to which an embodiment of the present disclosure is applicable. Vehicle-mounted terminals (a vehicle-mounted terminal 131 and a vehicle-mounted terminal 132) autonomously select transmission resources from resources of the sidelink for data transmission. Optionally, the vehicle-mounted terminals may select the transmission resources randomly, or select the transmission resources by means of sensing.

Figure 3:
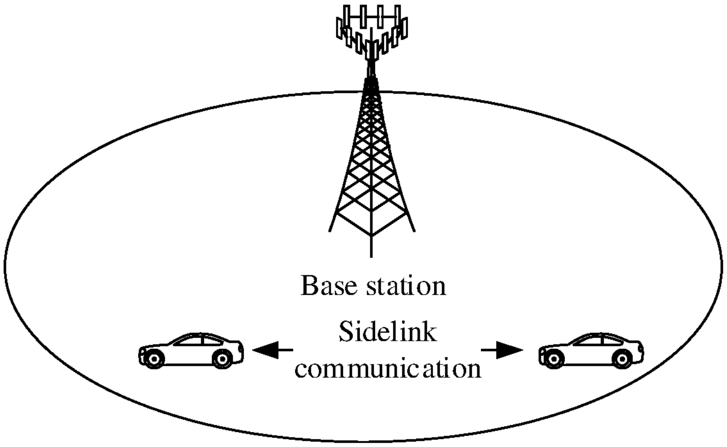
FIG. 3 is a diagram of sidelink communication within network coverage according to the present disclosure.
Figure 4:
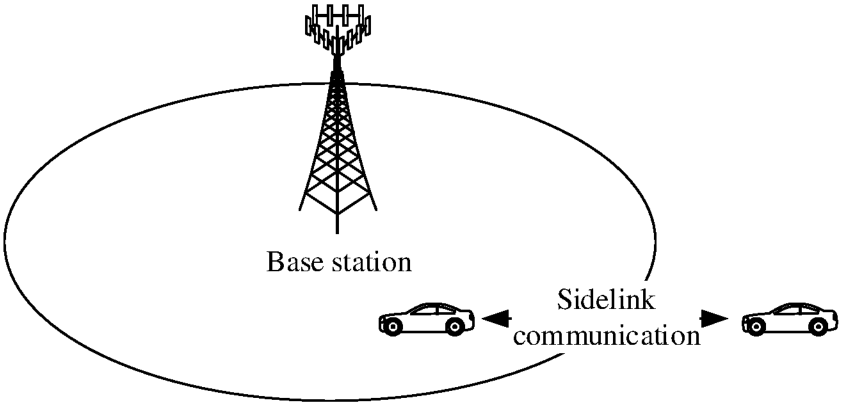
FIG. 4 is a diagram of sidelink communication under partial network coverage according to the present disclosure.
Figure 5:
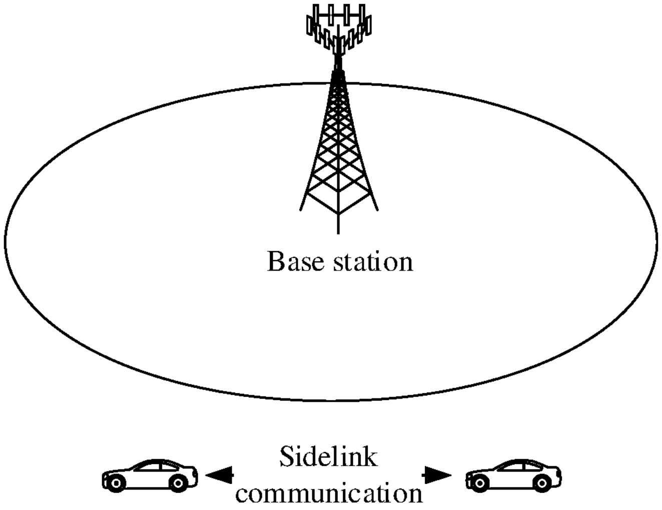
FIG. 5 is a diagram of sidelink communication outside network coverage according to the present disclosure.

It should be noted that, according to network coverage situations in which a terminal performing communication is, sidelink communication can be categorized into sidelink communication within network coverage, as illustrated in FIG. 3; sidelink communication under partial network coverage, as illustrated in FIG. 4; and sidelink communication outside network coverage, as illustrated in FIG. 5.

FIG. 3: in the sidelink communication within the network coverage, all the terminals performing sidelink communication are within coverage of a same base station. Therefore, all the terminals may perform the sidelink communication based on a same sidelink configuration via receiving configuration signaling from the base station.

FIG. 4: in a case of the sidelink communication under the partial network coverage, some terminals performing the sidelink communication are located within the coverage of the base station. These terminals may receive the configuration signaling from the base station and perform the sidelink communication based on a configuration of the base station. However, terminals outside the network coverage are incapable of receiving the configuration signaling from the base station. In this case, the terminals outside the network coverage determine a sidelink configuration for the sidelink communication based on pre-configuration information and information carried in a Physical Sidelink Broadcast Channel (PSBCH) that is carried by the terminals within the network coverage.

FIG. 5: for the sidelink communication outside the network coverage, all the terminals that perform the sidelink communication are located outside the network coverage, in which case all the terminals determine the sidelink configuration for the sidelink communication based on the pre-configuration information.

It should be noted that D2D communication is a sidelink (SL) transmission technology based on terminal to terminal, which is different from a manner in which communication data is received or transmitted by a base station in a conventional cellular system, and thus has higher spectral efficiency and a lower transmission delay. A V2X system uses direct terminal-to-terminal communication. Two transmission modes are defined in the 3rd Generation Partnership Project (3GPP), which are noted as a first mode and a second mode. The embodiments of the present disclosure can be applied to the second mode.

First mode: a transmission resource of the terminal is allocated by a base station. The terminal transmits data on a sidelink based on the resource allocated by the base station. The base station may allocate a resource for a single transmission or a resource for a semi-persistent transmission to the terminal. As illustrated in FIG. 3, the terminal is located within the network coverage, and the network allocates a transmission resource used for sidelink transmission to the terminal.

Second mode: the terminal selects, from a resource pool, a resource for data transmission. As illustrated in FIG. 5, the terminal is located outside coverage of a cell. In this case, the terminal autonomously selects, from a pre-configured resource pool, a transmission resource for the sidelink transmission. Alternatively, as illustrated in FIG. 3, the terminal autonomously selects, from a resource pool configured by the network, a transmission resource for the sidelink transmission.

In New Radio-Vehicle to Everything (NR-V2X), autonomous driving may be supported. Therefore, higher requirements are posed for data interaction between vehicles, such as higher throughput, a lower delay, higher reliability, greater coverage, more flexible resource allocation, or the like.

Figure 6:
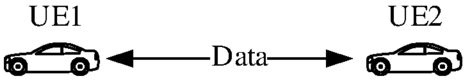
FIG. 6 is a diagram of unicast sidelink communication according to the present disclosure.
Figure 7:
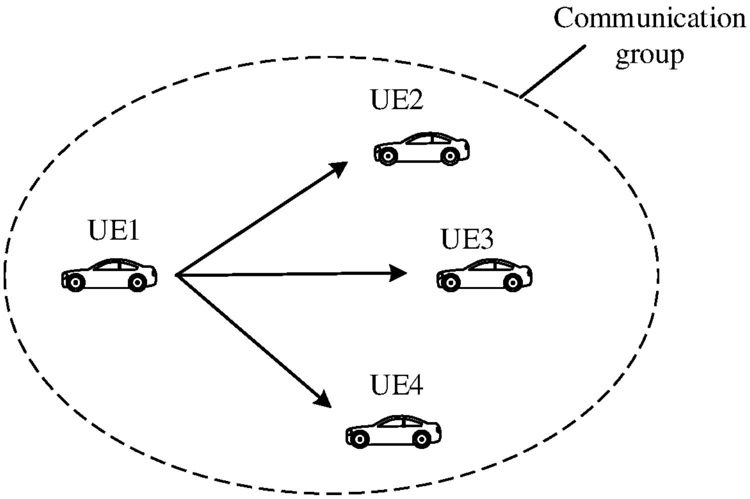
FIG. 7 is a diagram of multicast sidelink communication according to the present disclosure.
Figure 8:
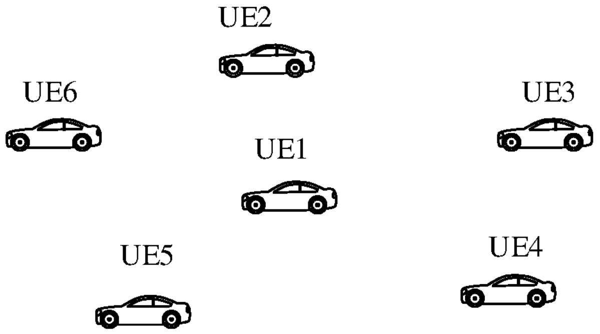
FIG. 8 is a diagram of broadcast sidelink communication according to the present disclosure.

In LTE-V2X, a broadcast transmission manner is supported. In the NR-V2X, unicast and multicast transmission manners are introduced. For the unicast transmission manner, a receiving end includes only one terminal. As illustrated in FIG. 6, unicast transmission is performed between UE1 and UE2. For the multicast transmission manner, a receiving end refers to all terminals within a same communication group or all terminals within a certain transmission distance. As illustrated in FIG. 7, UE1, UE2, UE3, and UE4 form one communication group, in which UE1 transmits data and all other terminals within the group are receiver terminals. For a broadcast transmission manner, the receiving end is any terminal around a transmitter terminal. As illustrated in FIG. 8, UE1 is a transmitter terminal and other terminals around UE1, i.e., UE2-UE6, are all receiver terminals.

A resource pool is introduced to a sidelink transmission system. The resource pool is a set of transmission resources. Both transmission resources configured by the network and transmission resources autonomously selected by the terminal are resources in the resource pool. The resource pool may be configured by a pre-configuration or a network configuration. One or more resource pools may be configured. Resource pools are categorized into a transmission resource pool and a receiving resource pool. The transmission resource pool means that transmission resources in this resource pool are used to transmit sidelink data. The receiving resource pool means that the terminal receives sidelink data on transmission resources in this resource pool.

For better understanding of the embodiments of the present disclosure, a sensing-based resource selection method related to the present disclosure is explained.

LTE-V2X supports full or partial sensing. Full sensing means that the terminal can sense data transmitted by other terminals in all slots (or subframes) except a slot in which the terminal transmits data. Partial sensing, which is in the interest of energy saving of the terminal, means that the terminal only needs to sense part of the slots (or subframes) and perform the resource selection based on a result for partial sensing.

In some embodiments, when partial sensing is not configured at an upper layer, full sensing is adopted for the resource selection by default.

At a moment n, the terminal is performs the resource selection within $[n+T_1, n+T_2]$ according to a sensing result within a sensing window $[n-1000, n-1]$. A time unit of the sensing window and the selection window may be at least one of a millisecond, a slot, or a subframe.

The moment n may include at least one of a moment to trigger the resource selection, a moment to trigger the resource reselection, a moment when a high layer triggers the resource report performed by bottom layer, or a moment when a new data packet arrives.

The above-mentioned various moments may be the same moment. For example, the moment to trigger the resource selection may also be the moment when the new data packet arrives. The moment to trigger the resource reselection may also be the moment when the new data packet arrives. The moment to trigger the resource selection may also be the moment when the high layer triggers the resource report performed by bottom layer.

Figure 9:
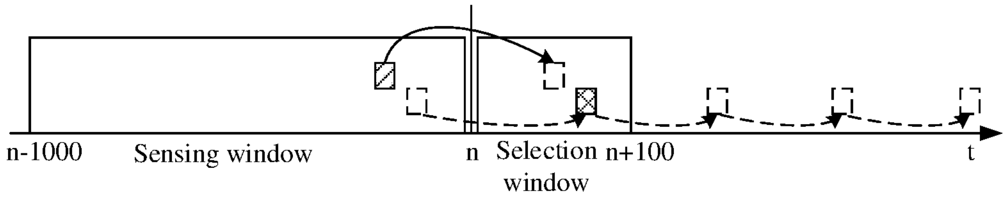
FIG. 9 is a diagram of resource selection based on sensing according to the present disclosure.

$T_1 \le 4$. $T_{2min}(prio_{TX}) \le T_2 \le 100$. $T_{2min}(prio_{TX})$ may be a parameter configured by a higher layer. In addition, $T_1$ should be greater than a processing delay of the terminal, and $T_2$ should be within a delay requirement range of a service. For example, when the delay requirement of the service is 50 ms, $20 \le T_2 \le 50$; and when the delay requirement of the service is 100 ms, $20 \le T_2 \le 100$, as illustrated in FIG. 9.

A process of the resource selection by the terminal within the selection window is as follows (for a specific resource selection process, reference may be made to operation steps described in the above standard. Several major resource selection steps are listed here)

1. The terminal treats all available resources in the selection window as a set A.
2. If the terminal obtains no sensing results for some subframes within the sensing window, resources on corresponding subframes within the selection window for these subframes are excluded.
3. If the terminal detects a Physical Sidelink Control Channel (PSCCH) in the sensing window, Reference Signal Received Power (RSRP) of a Physical Sidelink Shared Channel (PSSCH) scheduled by the PSCCH is measured. If the measured PSSCH-RSRP is higher than a PSSCH-RSRP threshold, and a reserved transmission resource of control information determined based on reservation information of the control information is determined to be in a resource conflict with data to be transmitted by a user, the user excludes the transmission resource from the set A. The PSSCH-RSRP threshold is determined based on priority information carried in the detected PSCCH and a priority of data to be transmitted by the terminal.
4. If a number of remaining resources in the set A is smaller than 20% of a total number of the resources, the terminal may raise the PSSCH-RSRP threshold by 3 dB, and repeat steps 1 and 3 until the number of the remaining resources in the set A is greater than 20% of the total number of the resources.
5. The terminal performs a Sidelink Received Signal Strength Indicator (SL RSSI) detection on the remaining resources in the set A, sorts the remaining resources in the set A based on their energy levels, and puts resources having the lowest energy, 20% relative to the number of the resources in the set A, into a set B.
6. The terminal selects a resource from the set B equiprobably for the data transmission.

Compared with full sensing, the terminal based on partial sensing selects Y slots in a resource selection window, and determines, based on a sensing result, whether resources on the Y slots can be used as candidate resources. If the resources on the Y slots can be used as the candidate resources, the resources are put into a set SB. If a number of elements in the set SB is greater than or equal to 20% of the total number of the resources on the Y slots, the SB is reported to the upper layer.

For better understanding of the embodiments of the present disclosure, Discontinuous Reception (DRX) at an interface NR Uu related to the disclosure is described.

In a wireless network, when data needs to be transmitted, a UE needs to monitor a Physical Downlink Control Channel (PDCCH) all the time, and transmit and receive data based on an indication message transmitted from a network side, which results in a high power consumption of the UE and a large delay of data transmission. Therefore, the 3GPP standard protocol introduces a DRX energy saving strategy to an LTE system.

Figure 10:
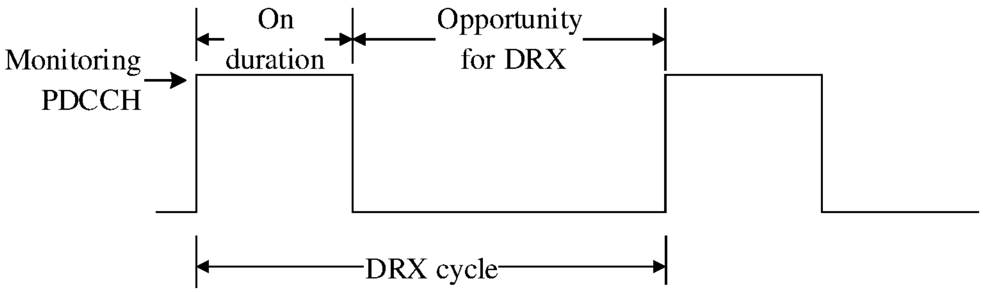
FIG. 10 is a diagram of a mechanism of sidelink DRX according to the present disclosure.

A basic mechanism of the DRX is to configure a DRX cycle for a UE in a Radio Resource Control (RRC) Connected (RRC_CONNECTED) state. As illustrated in FIG. 10, the DRX cycle consists of on duration and an opportunity for DRX. During the on duration (which is also referred to as active time), the UE monitors and receives a Physical Downlink Control Channel (PDCCH). During the Opportunity for DRX (which is also referred to as inactive time), the UE does not receives the PDCCH to reduce power consumption. Compared with the DRX on duration, the opportunity for DRX may also be referred to as DRX off duration. In a DRX operation, the UE may control the on duration and the off duration of the UE according to some timer parameters configured by the network device.

For better understanding of the embodiments of the present disclosure, an SL DRX mechanism related to the present disclosure is explained.

A mechanism of energy-saving and consumption reduction for a terminal is discussed in Release17 (R17) SL technology. For a purpose of energy saving, it is considered to introduce a DRX mechanism to the SL, i.e., SL DRX. Similar to the DRX mechanism of the Uu interface, the SL DRX mechanism allows the terminal to receive data from other terminals in the On Duration, and enter a sleep state in the DRX Off Duration when no data is detected, thereby lowering power consumption.

For better understanding of the embodiments of the present disclosure, measurement of the CRB related to the present disclosure is explained.

A measurement result for the CBR reflects a degree of congestion of a channel, and may range in [0, 1]. The higher the CBR value is, the more congested the channel is, and the more likely that the resource conflict would occur. The lower the CBR value is, the more idle the channel is, and the less likely that the resource conflict would occur. A CBR value measured by the UE in a slot n may be a ratio of a number of subchannels with measurement results of SL RSSI within the measurement window [n−a, n−1] exceeding a preconfigured threshold to a total number of subchannels measured by the UE within the window. The parameter a is determined according to a size of a CBR time window (timeWindowSize-CBR) of a higher-layer parameter, and has a value of 100 or $100\cdot 2^{\mu}$ slots. μ denotes a subcarrier spacing corresponding to a sidelink Band Width Part (BWP). For example, μ=0 may correspond to a subcarrier spacing of 15 kHz, and μ=1 may correspond to a subcarrier spacing of 30 kHz.

Figure 11:
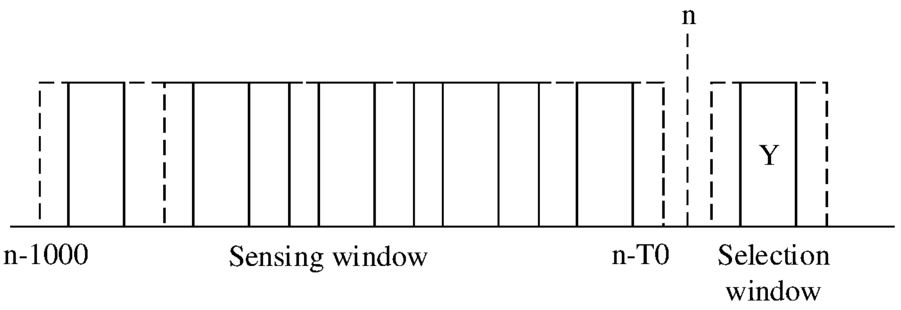
FIG. 11 is a diagram of a mechanism of partial sensing according to the present disclosure.

In an NR SL system, in order to lower the power consumption of the UE, the mechanism of partial sensing and the mechanism of the SL DRX are introduced. In the two mechanisms, the UE is not always in a sensing state. For example, in the case of partial sensing, the UE only senses part of slots within each period. As illustrated in FIG. 11, the UE only senses part of the slots instead of sensing all the slots within the sensing window. In addition, in the mechanism of SL DRX, the UE performs reception of data during the active time of the DRX, and the UE does not perform the reception of the data during the inactive time of the DRX and normally does not perform the measurement. How the UE can measure the CBR in these two mechanisms is a problem to be solved.

In view of the above problem, the present disclosure proposes a solution for determining the CBR, which can be used to calculate the CBR in the sidelink transmission system configured with the SL DRX or the partial sensing.

The technical solution of the disclosure is elaborated below with specific embodiments.

Figure 12:
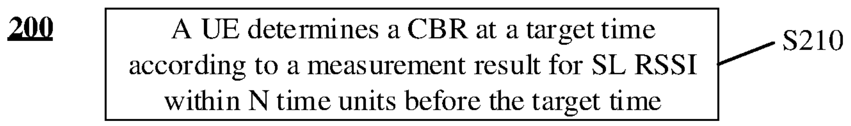
FIG. 12 is a flowchart of a wireless communication method according to an embodiment of the present disclosure.

FIG. 12 is a flowchart of a method 200 for measuring a CBR according to an embodiment of the disclosure. As illustrated in FIG. 12, the method 200 for measuring the CBR includes at least part of the following contents.

At S210, a UE determines a CBR at a target time according to a measurement result for Sidelink Received Signal Strength Indicator (SL RSSI) within N time units before the target time.

Embodiments of the disclosure may apply to the partial sensing mechanism and the SL DRX mechanism. Of course, embodiments of the disclosure may also apply to other mechanisms or scenarios, which would not be limited in the disclosure.

In the embodiments of the disclosure, the UE measures the SL RSSI in the N time units, and obtains a measurement result for the SL RSSI in the N time units. That is, in the embodiments of the disclosure, the N time units are time units available for the UE to measure the SL RSSI.

In some embodiments, a ratio of a number of subchannels with measurement results of the SL RSSI within the N time units exceeding a preset threshold to a total number of subchannels measured by the UE within the N time units is the CBR at the target time.

In some embodiments, the preset threshold is configured by a network device. Alternatively, the preset threshold is prescribed in a protocol.

In some embodiments, N is pre-configured or prescribed in a protocol, or N is configured by the network device.

In some embodiments, N is indicated by the network device by means of indication information in a resource pool configuration.

For example, N=100, N=200, N=400, N=800, etc.

In some embodiments, a time unit of the N time units may include, but is not limited to, at least one of the following.

A slot, a symbol, or a subframe.

In some embodiments, the N time units are time units available for the UE to measure the SL RSSI. Alternatively, the N time units do not include time units unavailable for the UE to measure the SL RSSI.

In some embodiments, the N time units may include part or all of time units during the DRX active time.

In some embodiments, a number of the time units included in the DRX active time may be determined by means of DRX configuration.

In some embodiments, the DRX configuration may include, but is not limited to, at least one of the following.

A sidelink DRX on duration timer (sl-drx-onDurationTimer), a sidelink DRX inactivity timer (sl-drx-InactivityTimer), or a sidelink DRX retransmission timer (sl-drx-RetransmissionTimer).

In some embodiments, a number of the time units during the DRX active time is determined according to at least one of the following.

The sidelink DRX on duration timer (sl-drx-onDurationTimer), the sidelink DRX inactivity timer (sl-drx-InactivityTimer), or the sidelink DRX retransmission timer (sl-drx-RetransmissionTimer).

In some embodiments, the UE may measure the SL RSSI or perform sensing during DRX inactive time. The N time units include time units that are available for the UE to measure the SL RSSI during the DRX active time and the DRX inactive time.

In some embodiments, the N time units include part or all of candidate time units in at least one period within a resource sensing window, and the N time units do not include non-candidate time units within the resource sensing window. In this case, embodiments of the disclosure apply to the partial sensing mechanism.

In some embodiments, a number and a time domain position of the candidate time units in the at least one period are determined according to a number and a time domain position of candidate time units selected by the UE in the resource selection window.

In some embodiments, the number of the candidate time units selected by the UE in the resource selection window is determined according to a configuration parameter, and the configuration parameter is configured to indicate a minimum number of time units selected in the resource selection window.

In some embodiments, the N time units do not include at least one of the following.

A time unit unavailable for the UE to perform the sensing, a time unit not corresponding to a sensing result, or a time unit in which the UE sends sidelink information.

In some embodiments, the N time units are N time units that are previous to and closest to the target time unit and are available for the UE to measure the SL RSSI.

Technical solutions of the disclosure are elaborated below through the first embodiment and the second embodiment.

First embodiment: the CBR is measured in the system configured with the SL DRX.

Figure 13:
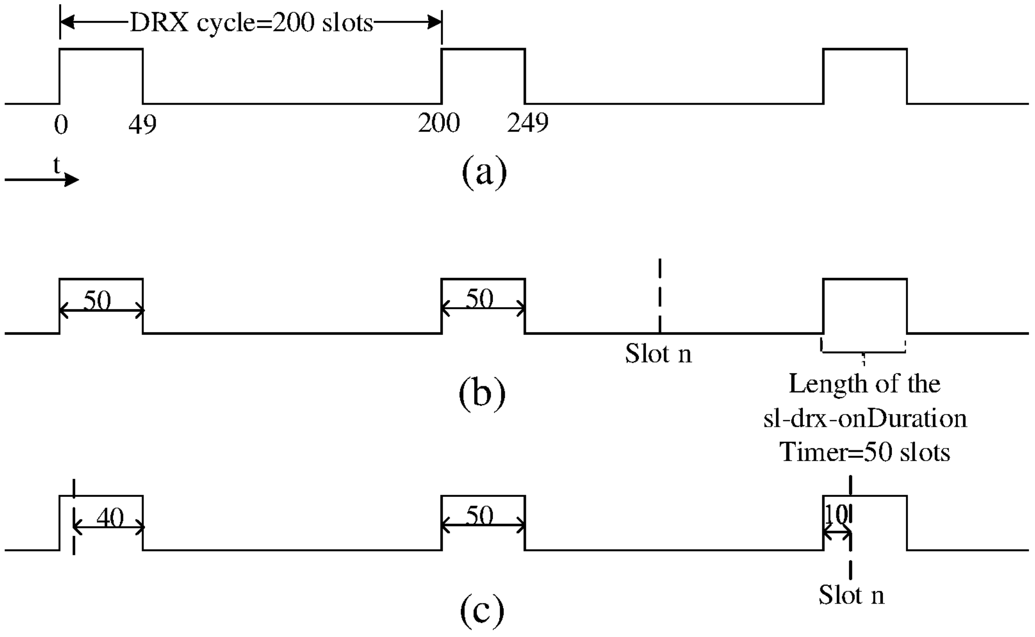
FIG. 13 is a diagram of determining N time units according to an embodiment of the present disclosure.

In an implementation of the first embodiment, the system is configured with the SL DRX. The DRX cycle is 200 slots. The SL DRX active time is decided only by the sl-drx-onDurationTimer, and the sl-drx-InactivityTimer or the sl-drx-RetransmissionTimer, etc., are not be configured. A length of the sl-drx-onDurationTimer is 50 slots, as illustrated in figure (a) of FIG. 13. A resource pool configuration parameter includes indication information used for configuring the parameter N=100 (i.e., the N time units are 100 slots). In response to that the UE needs to determine the measurement result for the CBR in the slot n, the UE determines the CBR in the slot n according to the measurement result for the SL RSSI in 100 slots before the slot n. Since the DRX inactive time is included before the slot n, and the UE does not measure the SL RSSI during the DRX inactive time, the UE can only calculate the CBR according to the measurement result for the SL RSSI in slots during two periods of the DRX active time (which amount to a total of 100 slots) before the slot n, as illustrated in figure (b) of FIG. 13. Similarly, for figure (c) of FIG. 13, if the slot n in which the UE determines the CBR is located within the DRX active time, and the UE has measured the SL RSSI in a total of 10 slots before the slot n within the current DRX active time, the UE needs to further determine the CBR in the slot n according to the measurement result for the SL RSSI in two preceding pieces of DRX active time, which may include 50 slots in a first DRX active time preceding the DRX active time in which the slot n is located and 40 slots in a second DRX active time preceding the DRX active time in which the slot n is located.

Figure 14:
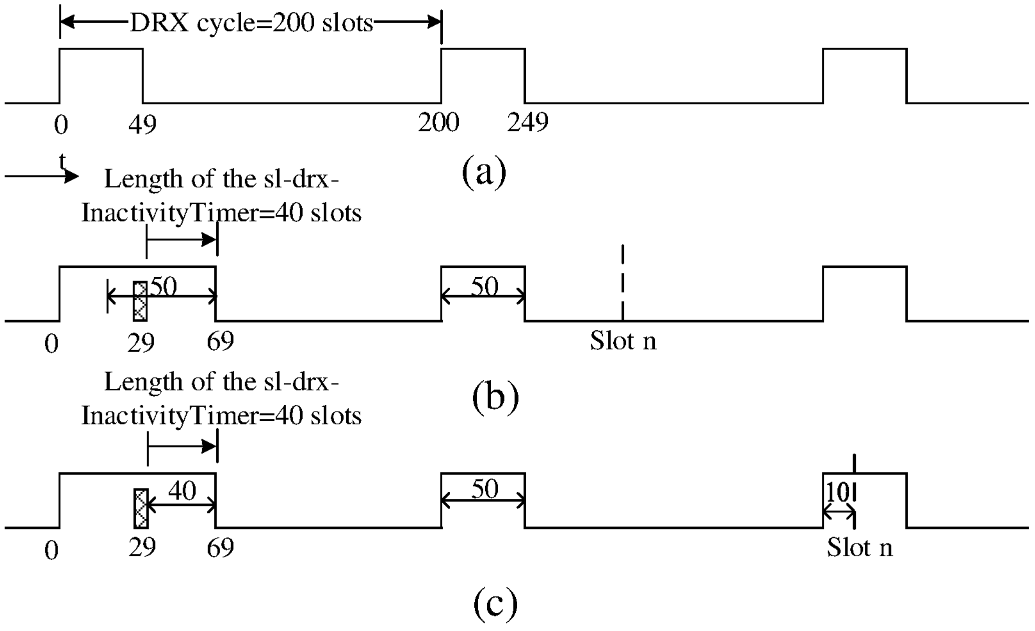
FIG. 14 is another diagram of determining N time units according to an embodiment of the present disclosure.

In another implementation of the first embodiment, the system is configured with the SL DRX. The DRX cycle is 200 slots. The length of the sl-drx-onDurationTimer is 50 slots. A length of the sl-drx-InactivityTimer is 40 slots. When the UE receives a PSCCH or a PSSCH during the DRX active time, the UE initiates or reset the sl-drx-InactivityTimer. The UE is in the DRX active state before the sl-drx-InactivityTimer expires. As illustrated in figures (b) and (c) of FIG. 14, the UE receives the PSCCH in the slot 29, and starts the sl-drx-InactivityTimer at the end of the slot 29, i.e., in the slot 30. The length of the sl-drx-InactivityTimer is 40 slots. The UE does not receive the PSCCH again before the sl-drx-InactivityTimer expires. Therefore, the sl-drx-InactivityTimer expires in the slot 69, and the UE switches to the DRX inactive time state. The resource pool configuration parameter may include the indication information used for configuring the parameter N=100 (i.e., the N time units are 100 slots). When the UE needs to determine the measurement result for the CBR in the slot n, the UE needs to determine the CBR in the slot n according to the measurement result for the SL RSSI in 100 slots before the slot n. Since the DRX inactive time is included before the slot n, and the UE does not measure the SL RSSI during the DRX inactive time, the UE can only calculate the CBR according to the measurement result for the SL RSSI in slots during two periods of the DRX active time (which amount to a total of 100 slots) before the slot n, as illustrated in figure (b) of FIG. 14. Similarly, for figure (c) of FIG. 14, if the slot n in which the UE determines the CBR is located within the DRX active time, and the UE has measured the SL RSSI in a total of 10 slots before the slot n within the current DRX active time, the UE needs to further determine the CBR in the slot n according to the measurement result for the SL RSSI in two preceding pieces of DRX active time, which may include 50 slots in a first DRX active time preceding the DRX active time in which the slot n is located and 40 slots in a second DRX active time preceding the DRX active time in which the slot n is located.

In the second embodiment, the CBR is measured based on the partial sensing mechanism.

In order to lower the energy consumption, the UE may perform the partial sensing, and perform resource selection based on a result for partial sensing, as illustrated in FIG. 11. When the UE needs to obtain the CBR, the UE can only determine the CBR according to the measurement result for the SL RSSI in slots in which the UE has performed partial sensing.

Figure 15:
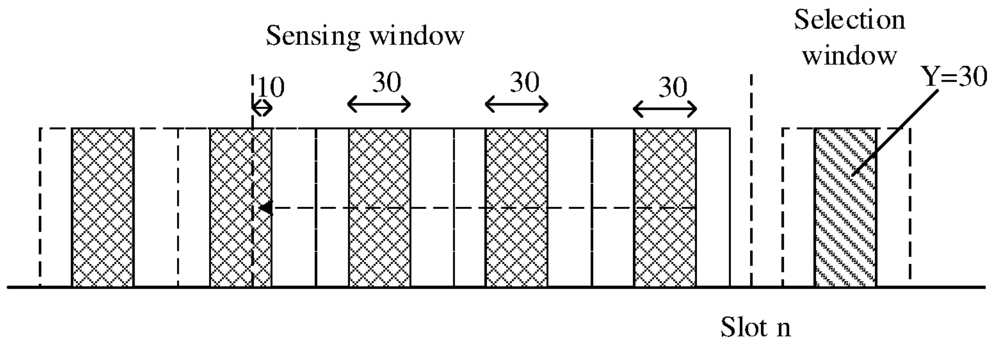
FIG. 15 is yet another diagram of determining N time units according to an embodiment of the present disclosure.

In an implementation of the second embodiment, as illustrated in FIG. 15, the UE performs the resource selection based on partial sensing. The resource pool configuration parameter may include indication information used for configuring the parameter N=100 (i.e., the N time units are 100 slots). The resource pool configuration parameter includes resource reservation period indication information used for configuring resource reservation periods $P_{reserve}$={100,200,300,400,500} ms acceptable to the resource pool. The UE may select Y=30 slots in a resource selection window as candidate slots during the partial sensing. The UE may determine 30 sensing slots corresponding to each period in the sensing window according to the resource reservation period Prev. That is, 30 slots need to be sensed in 30 slots in each period. When the UE needs to determine the CBR in the slot n, the UE needs to determine the CBR in the slot n according to the measurement result for the SL RSSI in 100 slots before the slot n. Therefore, the UE needs to calculate the CBR in the slot n according to the measurement result for the SL RSSI in 4 periods before the slot n (the fourth to last period only includes the last 10 slots). For example, the UE determines the CBR according to measurement results in 30 respective slots in each period of the period 100 ms, the period 200 ms and the period 300 ms before the slot n, as well as a measurement result in 10 slots in the period 400 before the slot n.

Further in the second embodiment, if the 30 slots include a slot for sending sidelink data, the UE cannot measure the SL RSSI on the slot for sending the sidelink data, and the slot for sending the sidelink data cannot be used for calculating the CBR. Therefore, the flow continues to trace a preceding slot available for calculating the CBR. For example, as illustrated in FIG. 15, if there are two slots for sending the sidelink data by the UE in the 30 respective slots in each period within the sensing window, a number of slots available for measuring the SL RSSI in each period is 28. Therefore, the UE needs to calculate the CBR in the slot n according to the measurement result for the SL RSSI in 4 periods before the slot n (the fourth to last period includes the last 16 slots available for the sidelink measurement).

In the third embodiment, the CBR is measured in the system configured with the SL DRX and the partial sensing.

In the third embodiment, both the SL DRX and the partial sensing are configured. The UE may measure the SL RSSI or perform sensing in during the DRX inactive time. Specifically, when the UE needs to obtain the CBR, the UE may calculate the CBR based on the measurement result for the SL RSSI in the slots in which the UE has performed the partial sensing.

Figure 16:
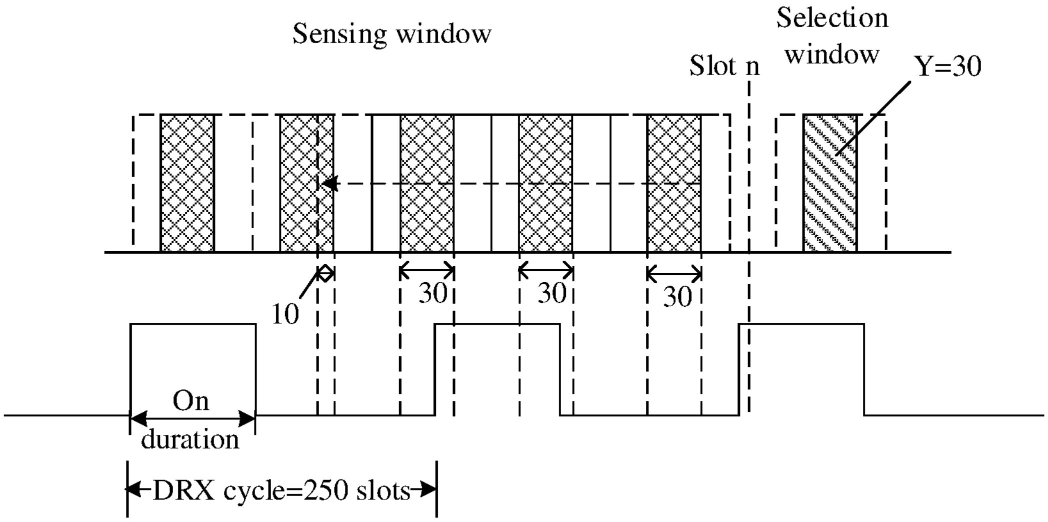
FIG. 16 is still another diagram of determining N time units according to an embodiment of the present disclosure.

In an implementation of the third embodiment, as illustrated in FIG. 16, the UE performs the resource selection based on partial sensing. The resource pool configuration parameter may include indication information used for configuring the parameter N=100 (i.e., the N time units are 100 slots). The resource pool configuration parameter includes resource reservation period indication information used for configuring resource reservation periods $P_{reserve}$={100,200, 300,400,500} ms acceptable to the resource pool. The UE may select Y=30 slots in a resource selection window as candidate slots during the partial sensing. The UE may determine 30 sensing slots corresponding to each period in the sensing window according to the resource reservation period $P_{reserve}$. That is, 30 slots need to be sensed in 30 slots in each period. When the UE needs to determine the CBR in the slot n, the UE needs to determine the CBR in the slot n according to the measurement result for the SL RSSI in 100 slots before the slot n. Therefore, the UE needs to calculate the CBR in the slot n according to the measurement result for the SL RSSI in 4 periods before the slot n (the fourth to last period only includes the last 10 slots). For example, the UE determines the CBR according to measurement results in 30 respective slots in each period of the period 100 ms, the period 200 ms and the period 300 ms before the slot n, as well as a measurement result in 10 slots in the period 400 before the slot n.

Further in the third embodiment, if the 30 slots include a slot for sending sidelink data, the UE cannot measure the SL RSSI on the slot for sending the sidelink data, and the slot for sending the sidelink data cannot be used for calculating the CBR. Therefore, the flow continues to trace a preceding slot available for calculating the CBR. For example, as illustrated in FIG. 16, if there are two slots for sending the sidelink data by the UE in the 30 respective slots in each period within the sensing window, a number of slots available for measuring the SL RSSI in each period is 28. Therefore, the UE needs to calculate the CBR in the slot n according to the measurement result for the SL RSSI in 4 periods before the slot n (the fourth to last period includes the last 16 slots available for the sidelink measurement).

Therefore, in the embodiments of the disclosure, the UE determines the CBR at the target time according to a measurement result for SL RSSI within N time units before the target time, so as to calculate the CBR in the sidelink transmission system configured with the SL DRX or the partial sensing.

Embodiments of the disclosure at the UE side are elaborated with reference to FIG. 12 to FIG. 16. Embodiments of the disclosure at the network side are elaborated below with reference to FIG. 17. Understandably, the embodiments at the network side correspond to the embodiments at the UE side. Reference can be made to the embodiments at the UE side for similar description.

Figure 17:
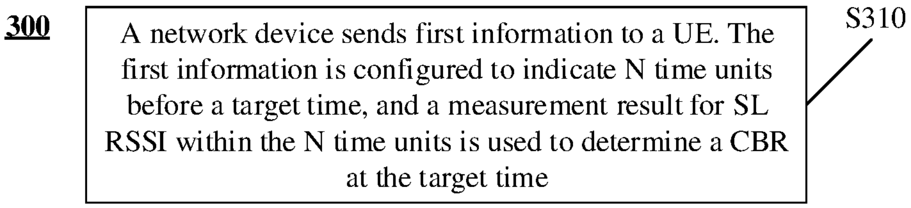
FIG. 17 is a flowchart of another wireless communication method according to an embodiment of the present disclosure.

FIG. 17 is a flowchart of a method 300 for measuring a CBR according to an embodiment of the disclosure. As illustrated in FIG. 17, the method 300 for measuring the CBR may include at least part of the following contents.

At S310, a network device sends first information to a UE. The first information is configured to indicate N time units before a target time, and a measurement result for SL RSSI within the N time units is used to determine a CBR at the target time.

Embodiments of the disclosure may apply to the partial sensing mechanism and the SL DRX mechanism. Of course, embodiments of the disclosure may also apply to other mechanisms or scenarios, which would not be limited in the disclosure.

In the embodiments of the disclosure, the UE measures the SL RSSI in the N time units, and obtains a measurement result for the SL RSSI in the N time units. That is, in the embodiments of the disclosure, the N time units are time units available for the UE to measure the SL RSSI.

In some embodiments, a ratio of a number of subchannels with measurement results of the SL RSSI within the N time units exceeding a preset threshold to a total number of subchannels measured by the UE within the N time units is the CBR at the target time.

In some embodiments, the preset threshold is configured by a network device. Alternatively, the preset threshold is prescribed in a protocol.

In some embodiments, N is pre-configured or prescribed in a protocol, or N is configured by the network device.

In some embodiments, N is indicated by the network device by means of indication information in a resource pool configuration.

For example, N=100, N=200, N=400, N=800, etc.

In some embodiments, a time unit of the N time units may include, but is not limited to, at least one of the following.

A slot, a symbol, or a subframe.

In some embodiments, the N time units are time units available for the UE to measure the SL RSSI. Alternatively, the N time units do not include time units unavailable for the UE to measure the SL RSSI.

In some embodiments, the N time units may include part or all of time units during the DRX active time.

In some embodiments, a number of the time units included in the DRX active time may be determined by means of DRX configuration.

In some embodiments, the DRX configuration may include, but is not limited to, at least one of the following.

A sidelink DRX on duration timer (sl-drx-onDurationTimer), a sidelink DRX inactivity timer (sl-drx-InactivityTimer), or a sidelink DRX retransmission timer (sl-drx-RetransmissionTimer).

In some embodiments, a number of the time units during the DRX active time is determined according to at least one of the following.

The sidelink DRX on duration timer (sl-drx-onDurationTimer), the sidelink DRX inactivity timer (sl-drx-InactivityTimer), or the sidelink DRX retransmission timer (sl-drx-RetransmissionTimer).

In some embodiments, the UE may measure the SL RSSI or perform sensing during DRX inactive time. The N time units include time units that are available for the UE to measure the SL RSSI during the DRX active time and the DRX inactive time.

In some embodiments, the N time units include part or all of candidate time units in at least one period within a resource sensing window, and the N time units do not include non-candidate time units within the resource sensing window. In this case, embodiments of the disclosure apply to the partial sensing mechanism.

In some embodiments, a number and a time domain position of the candidate time units in the at least one period are determined according to a number and a time domain position of candidate time units selected by the UE in the resource selection window.

In some embodiments, the number of the candidate time units selected by the UE in the resource selection window is determined according to a configuration parameter, and the configuration parameter is configured to indicate a minimum number of time units selected in the resource selection window.

In some embodiments, the N time units do not include at least one of the following.

A time unit unavailable for the UE to perform the sensing, a time unit not having a sensing result, or a time unit in which the UE sends sidelink information.

In some embodiments, the N time units are N time units that are previous to and closest to the target time unit and are available for the UE to measure the SL RSSI.

In some embodiments, the network device configures the first information through at least one of a system message, an RRC message, or a Media Access Control Control Element (MAC CE).

Therefore, in the embodiments of the disclosure, the network device indicates N time units before the target time, so that the UE determines the CBR at the target time according to the measurement result for the SL RSSI within the N time units before the target time, which can be used to calculate the CBR in the sidelink transmission system configured with the SL DRX or the partial sensing.

Method embodiments of the disclosure have been elaborated with reference to FIG. 12 to FIG. 17. Apparatus embodiments of the disclosure are elaborated below with reference to FIG. 18 to FIG. 22. It should be noted that the apparatus embodiments correspond to the method embodiments, and references can be made to the method embodiments for similar description.

Figure 18:
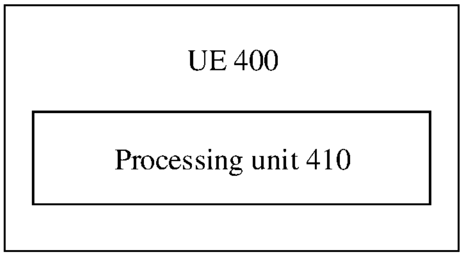
FIG. 18 is a block diagram of a UE according to an embodiment of the present disclosure.

FIG. 18 is a block diagram of a UE 400 according to an embodiment of the disclosure. As illustrated in FIG. 18, the UE 400 includes a processing unit 410.

The processing unit 410 is configured to determine a CBR at a target time according to a measurement result for SL RSSI within N time units before the target time.

In some embodiments, the N time units are time units available for the UE to measure the SL RSSI. Alternatively, the N time units do not include time units unavailable for the UE to measure the SL RSSI.

In some embodiments, the N time units include part or all of time units during DRX active time.

Alternatively, the N time units include time units that are available for the UE to measure the SL RSSI during the DRX active time and DRX inactive time.

In some embodiments, a number of the time units during the DRX active time is determined according to at least one of the following.

A sidelink DRX on duration timer (sl-drx-onDurationTimer), a sidelink DRX inactivity timer (sl-drx-InactivityTimer), or a sidelink DRX retransmission timer (sl-drx-RetransmissionTimer).

In some embodiments, the N time units include part or all of candidate time units in at least one period within a resource sensing window, and the N time units do not include non-candidate time units within the resource sensing window.

In some embodiments, a number and a time domain position of the candidate time units in the at least one period are determined according to a number and a time domain position of candidate time units selected by the UE in the resource selection window.

In some embodiments, the number of the candidate time units selected by the UE in the resource selection window is determined according to a configuration parameter, and the configuration parameter is configured to indicate a minimum number of time units selected in the resource selection window.

In some embodiments, the UE is applied to a scenario where resource selection is performed based on partial sensing.

In some embodiments, the N time units are N time units that are previous to and closest to the target time unit and are available for the UE to measure the SL RSSI.

In some embodiments, the N time units do not include at least one of the following.

A time unit unavailable for the UE to perform the sensing, a time unit not having a sensing result, or a time unit in which the UE sends sidelink information.

In some embodiments, N is pre-configured or prescribed in a protocol, or N is configured by the network device.

In some embodiments, N is indicated by the network device by means of indication information in a resource pool configuration.

In some embodiments, a time unit of the N time units include at least one of the following.

A slot, a symbol, or a subframe.

In some embodiments, the processing unit may be one or more processors.

Understandably, the UE 400 according to the embodiments of the disclosure may correspond to the UE in the method embodiments of the disclosure. The above-mentioned operations and/or functions and other operations and/or functions of various units of the UE 400 are intended to implement the corresponding flow of the UE in the method 200 shown in FIG. 12, which would not be repeated here for brevity.

Figure 19:
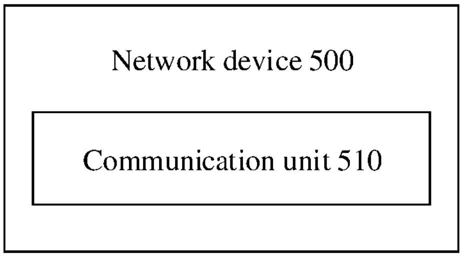
FIG. 19 is a block diagram of a network device according to an embodiment of the present disclosure.

FIG. 19 is a block diagram of a network device 500 according to an embodiment of the disclosure. As illustrated in FIG. 19, the network device 500 includes a communication unit 510.

The communication unit 510 is configured to send first information to a UE. The first information is configured to indicate N time units before a target time, and a measurement result for SL RSSI within the N time units is used to determine a CBR at the target time.

In some embodiments, the N time units are time units available for the UE to measure the SL RSSI. Alternatively, the N time units do not include time units unavailable for the UE to measure the SL RSSI.

In some embodiments, the N time units include part or all of time units during DRX active time.

Alternatively, the N time units include time units that are available for the UE to measure the SL RSSI during the DRX active time and DRX inactive time.

In some embodiments, a number of the time units during the DRX active time is determined according to at least one of the following.

A sidelink DRX on duration timer (sl-drx-onDuration-Timer), a sidelink DRX inactivity timer (sl-drx-Inactivity-Timer), or a sidelink DRX retransmission timer (sl-drx-RetransmissionTimer).

In some embodiments, the N time units include part or all of candidate time units in at least one period within a resource sensing window, and the N time units do not include non-candidate time units within the resource sensing window.

In some embodiments, a number and a time domain position of the candidate time units in the at least one period are determined according to a number and a time domain position of candidate time units selected by the UE in the resource selection window.

In some embodiments, the number of the candidate time units selected by the UE in the resource selection window is determined according to a configuration parameter, and the configuration parameter is configured to indicate a minimum number of time units selected in the resource selection window.

In some embodiments, the network device is applied to a scenario where resource selection is performed based on partial sensing.

In some embodiments, the N time units are N time units that are previous to and closest to the target time unit and are available for the UE to measure the SL RSSI.

In some embodiments, the N time units do not include at least one of the following.

A time unit unavailable for the UE to perform the sensing, a time unit not having a sensing result, or a time unit in which the UE sends sidelink information.

In some embodiments, N is pre-configured or prescribed in a protocol, or N is configured by the network device.

In some embodiments, N is indicated by the network device by means of indication information in a resource pool configuration.

In some embodiments, a time unit of the N time units include at least one of the following.

A slot, a symbol, or a subframe.

Understandably, the network device 500 according to the embodiments of the disclosure may correspond to the network device in the method embodiments of the disclosure. The above-mentioned operations and/or functions and other operations and/or functions of various units of the network device 500 are intended to implement the corresponding flow of the network device in the method 300 shown in FIG. 17, which would not be repeated here for brevity.

Figure 20:
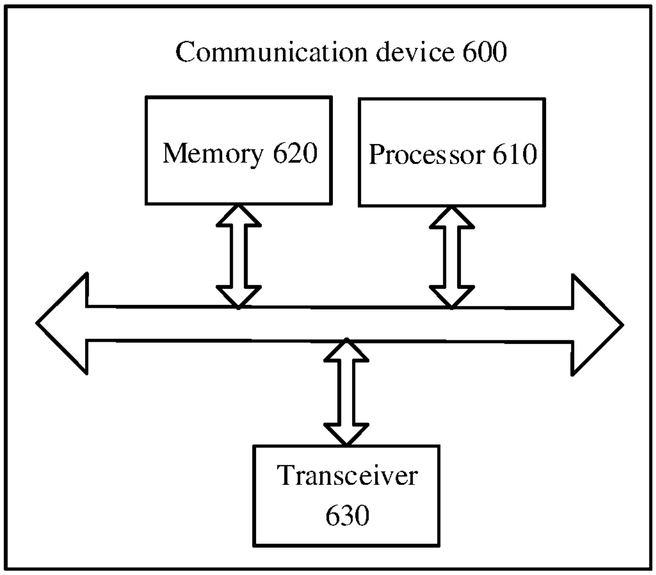
FIG. 20 is a block diagram of a communication device according to an embodiment of the present disclosure.

FIG. 20 is a block diagram of a communication device 600 according to an embodiment of the disclosure. The communication device 600 of FIG. 20 includes a processor 610. The processor 610 is configured to invoke and run a computer program from a memory to implement the methods in the embodiments of the disclosure.

In some embodiments, as illustrated in FIG. 20, the communication device 600 may further include a memory 620. The processor 610 is configured to invoke and run the computer program from the memory 620 to implement the methods in the embodiments of the disclosure.

The memory 620 may be a standalone device separate from the processor 610 or may be integrated into the processor 610.

In some embodiments, as illustrated in FIG. 20, the communication device 600 may further include a transceiver 630. The processor 610 may control the transceiver 630 to communicate with other devices. Specifically, the transceiver 630 may transmit information or data to other devices, or may receive information or data from other devices.

The transceiver 630 may include a transmitter and a receiver. The transceiver 630 may further include one or more antennas.

In some embodiments, the communication device 600 may be the network device according to the embodiments of the disclosure, and the communication device 600 may implement the corresponding flow implemented by the network device in various methods according to the embodiments of the disclosure, which would not be repeated here for brevity.

In some embodiments, the communication device 600 may be the UE according to the embodiments of the disclosure, and the communication device 600 may implement the corresponding flow implemented by the UE in various methods according to the embodiments of the disclosure, which would not be repeated here for brevity.

Figure 21:
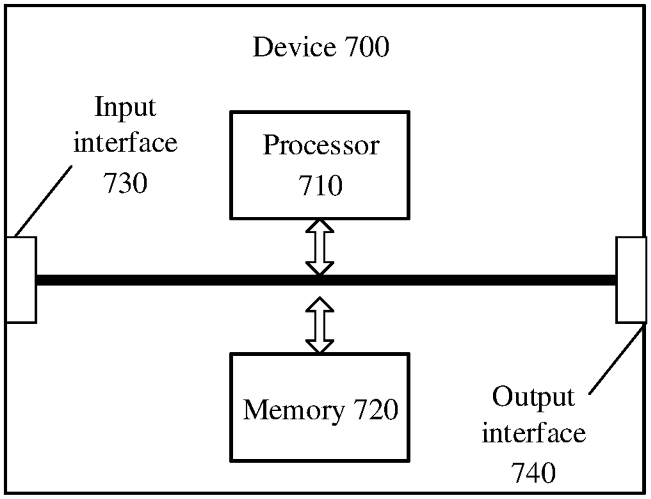
FIG. 21 is a block diagram of a device according to an embodiment of the present disclosure.

FIG. 21 is a structural diagram of a device according to an embodiment of the disclosure. The device 700 as illustrated in FIG. 21 may include a processor 710. The processor 710 may invoke and run a computer program from a memory to implement the methods in embodiments of the disclosure.

In some embodiments, as illustrated in FIG. 21, the device 700 may further include a memory 720. The processor 710 may invoke and run a computer program from the memory 720 to implement the methods in embodiments of the disclosure.

The memory 720 may be a standalone device separate from the processor 710, or may be integrated into the processor 710.

In some embodiments, the device 700 may further include an input interface 730. The processor 710 may control the input interface 730 to communication with other devices or chips. Specifically, the processor 710 may control the input interface 730 to acquire information or data from other devices or chips.

In some embodiments, the chip 700 may further include an output interface 740. The processor 710 may control the output interface 740 to communication with other devices or chips. Specifically, the processor 710 may control the output interface 740 to output information or data to other devices or chips.

In some embodiments, the device may be applied to the network device in the embodiments of the disclosure, and the device may implement the corresponding flow implemented by the network device in various methods according to the embodiments of the disclosure, which would not be repeated here for brevity.

In some embodiments, the device may be applied to the UE in embodiments of the disclosure, and the device may implement the corresponding flow implemented by the UE in various methods according to the embodiments of the disclosure, which would not be repeated here for brevity.

In some embodiments, the device mentioned in embodiments of the disclosure may also be a chip, such as a system-level chip, a system chip, a chip system, and a system-on-chip, etc.

Figure 22:
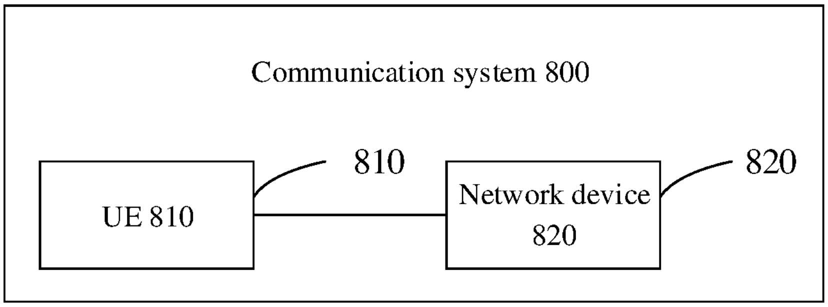
FIG. 22 is a block diagram of a communication system according to an embodiment of the present disclosure.

FIG. 22 is a block diagram of a communication system 800 according to an embodiment of the disclosure. As illustrated in FIG. 22, the communication system 800 includes a UE 810 and a network device 820.

The UE 810 is configured to implement the corresponding functions implemented by the UE in the above methods, and the network device 820 is configured to implement the corresponding functions implemented by the network device in the above methods, which would not be repeated here for brevity.

It should be noted that the processor according to the embodiments of the disclosure may be an integrated circuit chip having the capability to process signals. In the implementation process, each step of the above method can be accomplished by an integrated logic circuit of hardware or an instruction in the form of software in the processor. The processor described above may be a general purpose processor, a Digital Signal Processor (DSP), an Application Specific Integrated Circuit (ASIC), a Field Programmable Gate Array (FPGA) or other programmable logic devices, a discrete gate or a transistor logic device, a discrete hardware component. The processor may implement or perform the methods, steps, and logical block diagrams disclosed in the embodiments of the present disclosure. The general purpose processor may be a microprocessor or any conventional processor or the like. The steps of the method disclosed in the embodiments of the present disclosure can be directly accomplished by the hardware decoding processor, or be accomplished by the combination of hardware and software modules in the decoding processor. The software module may be located in a mature storage medium in the art, such as a Random Access Memory (RAM), a flash memory, a Read Only Memory (ROM), a Programmable Read-Only Memory (PROM), an Electrically Erasable Programmable Read-Only Memory (EEPROM), a register, etc. The storage medium may be located in the memory. The processor may read the information in the memory and may implement the operations of the foregoing methods in combination with the hardware.

It can be appreciated that the memory in the embodiments of the disclosure may be volatile or non-volatile memory, or may include both volatile and non-volatile memory. The non-volatile memory may be a Read-Only Memory (ROM), a Programmable Read-Only Memory (PROM), a Erasable Programmable Read-Only Memory (EPROM) or a flash memory. The volatile memory may be a Random Access Memory (RAM) that functions as an external cache. By way of illustrative instead of restrictive description, many forms of RAMs may be available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDR SDRAM), an Enhanced Synchronous Dynamic Random Access Memory (ESDRAM), a SynchLink Dynamic Random Access Memory (SLDRAM), and a Direct Rambus Random Access Memory (DR RAM). It should be noted that the memory of the methods and the system herein is intended to include, but is not limited to, these and any other memories of suitable types.

It should be understood that the memory as mentioned above is illustrative rather than restrictive. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), or the like. That is, the memory in the embodiments of the disclosure is intended to include, but is not limited to, memories of these and any other proper types.

Embodiments of the disclosure further provide a computer-readable storage medium configured to store a computer program.

In some embodiments, the computer-readable storage medium may be applied to the network device in the embodiments of the disclosure, and the computer program may cause a computer to implement the flow implemented by the network device in various methods of the embodiments of the disclosure, which would not be repeated here for brevity.

In some embodiments, the computer-readable storage medium may be applied to the UE in the embodiments of the disclosure, and the computer program may cause a computer to implement the flow implemented by the UE in various methods of the embodiments of the disclosure, which would not be repeated here for brevity.

Embodiments of the disclosure further provide a computer program product including computer program instructions.

In some embodiments, the computer program product may be applied to the network device in the embodiments of the disclosure, and the computer program instructions may cause a computer to implement the flow implemented by the network device in various methods of the embodiments of the disclosure, which would not be repeated here for brevity.

In some embodiments, the computer program product may be applied to the UE in the embodiments of the disclosure, and the computer program instructions may cause a computer to implement the flow implemented by the UE in various methods of the embodiments of the disclosure, which would not be repeated here for brevity.

Embodiments of the disclosure further provide a computer program.

In some embodiments, the computer program may be applied to the network device in the embodiments of the disclosure, and when the computer program is run on a computer, the computer program may cause the computer to implement the flow implemented by the network device in various methods of the embodiments of the disclosure, which would not be repeated here for brevity.

In some embodiments, the computer program may be applied to the UE in the embodiments of the disclosure, and when the computer program is run on a computer, the computer program may cause the computer to implement the flow implemented by the UE in various methods of the embodiments of the disclosure, which would not be repeated here for brevity.

Those skilled in the art may realize that the units and algorithm operations of the embodiments described in conjunction with the disclosed embodiments can be implemented by electronic hardware, or by a combination of computer software and electronic hardware. Whether these functions are implemented by hardware or by software may depend on the specific application and design constraints of the technical solution. Those skilled may use different methods to implement the described functions according to the specific application. Such implementation however should not be deemed going beyond the scope of the technical solutions of the disclosure.

Those skilled in the art can clearly understand that for the convenience and conciseness of the description, the specific working processes of the system, device, and unit described above can refer to the corresponding processes in the aforementioned method embodiments, which would not be repeated here.

In the embodiments of the present disclosure, it should be understood that the disclosed system, device and method may be implemented in other ways. For example, the device embodiments described above are merely illustrative. For example, the partitioning of the unit is merely a partitioning of logical function. Other partitioning mode may be adopted in practical implementation. For example, multiple units or components may be combined or integrated into another system, or some features may be ignored or not executed. In addition, the coupling, the direct coupling or the communication connection illustrated or discussed may be accomplished through some interfaces, and the indirect coupling or communication connection of devices or units may be electrical, mechanical or in other forms.

The units described above as separate components may or may not be physically separate, and the components displayed as units may or may not be a physical unit, that is, they may be located in one place or distributed over multiple network units. Some or all of the units can be selected according to practical needs to achieve the purpose of the embodiment.

In addition, in the embodiments of the present disclosure, various function units may be integrated into one processing unit, or each unit may be separately used as one unit, or two or more units may be integrated into one unit.

When realized in the form of software function modules and sold or used as a stand-alone product, the functions can also be stored in a computer-readable storage medium. Based on such an understanding, the technical solutions of the embodiments of the present disclosure, or the contribution of the technical solutions to the related art, can be embodied in the form of a software product. The software product can be stored in a storage medium, and may include multiple instructions to cause a computer device (which may be a personal computer, a server, a network device, etc.) to perform all or part of the methods described in the embodiments of the present disclosure. The storage medium may include various media that may store program codes, such as a U disk, a mobile hard disk, a Read-Only Memory (ROM), a Random Access Memory (RAM), a magnetic disk, an optical disc, etc.

The foregoing are only specific embodiments of the disclosure, however, the scope of protection of the disclosure is not limited thereto. Variation and substitution which may be readily conceived by those skilled in the art within the technical scope disclosed in the disclosure should fall within the scope of protection of the disclosure. Therefore, the scope of protection of the disclosure should conform to the scope of protection of the claims.

The invention claimed is:

1. A method for measuring a Channel Busy Ratio (CBR), comprising:

determining, by a User Equipment (UE), a CBR at a target time according to a measurement result for Sidelink Received Signal Strength Indicator (SL RSSI) within N time units before the target time, wherein the N time units comprise part or all of candidate time units in at least one period within a resource sensing window, and the N time units do not comprise non-candidate time units within the resource sensing window, wherein a number and a time domain position of the candidate time units in the at least one period are determined according to a number and a time domain position of candidate time units selected by the UE in a resource selection window.

2. The method of claim 1, wherein the N time units are time units available for the UE to measure the SL RSSI.

3. The method of claim 1, wherein the number of the candidate time units selected by the UE in the resource selection window is determined according to a configuration parameter, and the configuration parameter is configured to indicate a minimum number of time units selected in the resource selection window.

4. The method of claim 1, wherein the method is applied to a scenario where resource selection is performed based on partial sensing.

5. The method of claim 1, wherein the N time units do not comprise a time unit unavailable for the UE to perform sensing.

6. The method of claim 1, wherein N is pre-configured, or N is configured by a network device.

7. The method of claim 1, wherein N is indicated by a network device by means of indication information in a resource pool configuration, wherein a time unit of the N time units comprises a slot.

8. A method for measuring a Channel Busy Ratio (CBR), comprising:

sending, by a network device, first information to a User Equipment (UE), wherein the first information is configured to indicate N time units before a target time, and a measurement result for Sidelink Received Signal Strength Indicator (SL RSSI) within the N time units is used to determine a CBR at the target time, wherein the N time units comprise part or all of candidate time units in at least one period within a resource sensing window, and the N time units do not comprise non-candidate time units within the resource sensing window, wherein a number and a time domain position of the candidate time units in the at least one period are determined according to a number and a time domain position of candidate time units selected by the UE in a resource selection window.

9. The method of claim 8, wherein the N time units are time units available for the UE to measure the SL RSSI.

10. The method of claim 8, wherein the number of the candidate time units selected by the UE in the resource selection window is determined according to a configuration parameter, and the configuration parameter is configured to indicate a minimum number of time units selected in the resource selection window.

11. The method of claim 8, wherein the method is applied to a scenario where resource selection is performed based on partial sensing.

12. The method of claim 8, wherein the N time units do not comprise a time unit unavailable for the UE to perform sensing.

13. The method of claim 8, wherein N is pre-configured or prescribed in a protocol, or N is configured by a network device.

14. The method of claim 8, wherein N is indicated by a network device by means of indication information in a resource pool configuration, wherein a time unit of the N time units comprises a slot.

15. A User Equipment (UE), comprising a processor and a memory, wherein the processor is configured to invoke and run computer program stored in the memory to implement following operation:

determining a Channel Busy Ratio (CBR) at a target time according to a measurement result for Sidelink Received Signal Strength Indicator (SL RSSI) within N time units before the target time, wherein the N time units comprise part or all of candidate time units in at least one period within a resource sensing window, and the N time units do not comprise non-candidate time units within the resource sensing window, wherein a number and a time domain position of the candidate time units in the at least one period are determined according to a number and a time domain position of candidate time units selected by the UE in a resource selection window.

16. A network device, comprising a processor and a memory, wherein the processor is configured to invoke and run computer program stored in the memory to implement following operation:

sending first information to a User Equipment (UE), wherein the first information is configured to indicate N time units before a target time, and a measurement result for Sidelink Received Signal Strength Indicator (SL RSSI) within the N time units is used to determine a CBR at the target time, wherein the N time units comprise part or all of candidate time units in at least one period within a resource sensing window, and the N time units do not comprise non-candidate time units within the resource sensing window, wherein a number and a time domain position of the candidate time units in the at least one period are determined according to a number and a time domain position of candidate time units selected by the UE in a resource selection window.

* * * * *